United States Patent [19]

Torres

[11] Patent Number: 4,857,888

[45] Date of Patent: Aug. 15, 1989

[54] AUTOMOTIVE ALARM

[76] Inventor: Enrique R. Torres, Villa Kennedy, Edif. 28 #417, Villa Palmeras Sant., P.R. 00915

[21] Appl. No.: 152,962

[22] Filed: Feb. 8, 1988

[51] Int. Cl.$^4$ .............................................. B60R 25/00
[52] U.S. Cl. ..................... 340/426; 307/10.3
[58] Field of Search ...................... 340/63, 64, 65, 527; 307/10 AT; 180/287

[56] References Cited

U.S. PATENT DOCUMENTS

| | | | |
|---|---|---|---|
| 2,840,795 | 6/1958 | Gee | 340/63 |
| 3,634,697 | 1/1972 | McFarlane | 340/64 |
| 4,236,142 | 11/1980 | Lindsey | 340/64 |

Primary Examiner—Joseph A. Orsino
Assistant Examiner—Jeffery A. Hofsass
Attorney, Agent, or Firm—Leon Gilden

[57] ABSTRACT

An automotive alarm system is set forth wherein an ignition cutoff and audible alarm is sounded after a predetermined delay. The alarm apparatus includes a plurality of switches comprising a pressure foot treadle switch and an optional secondary switch with a third bypass switch positioned discretely within the automobile's interior for actuation of the apparatus. The third switch is formed as a cutoff switch positioned under the hood of an associated automobile or a like inaccessible place.

1 Claim, 2 Drawing Sheets

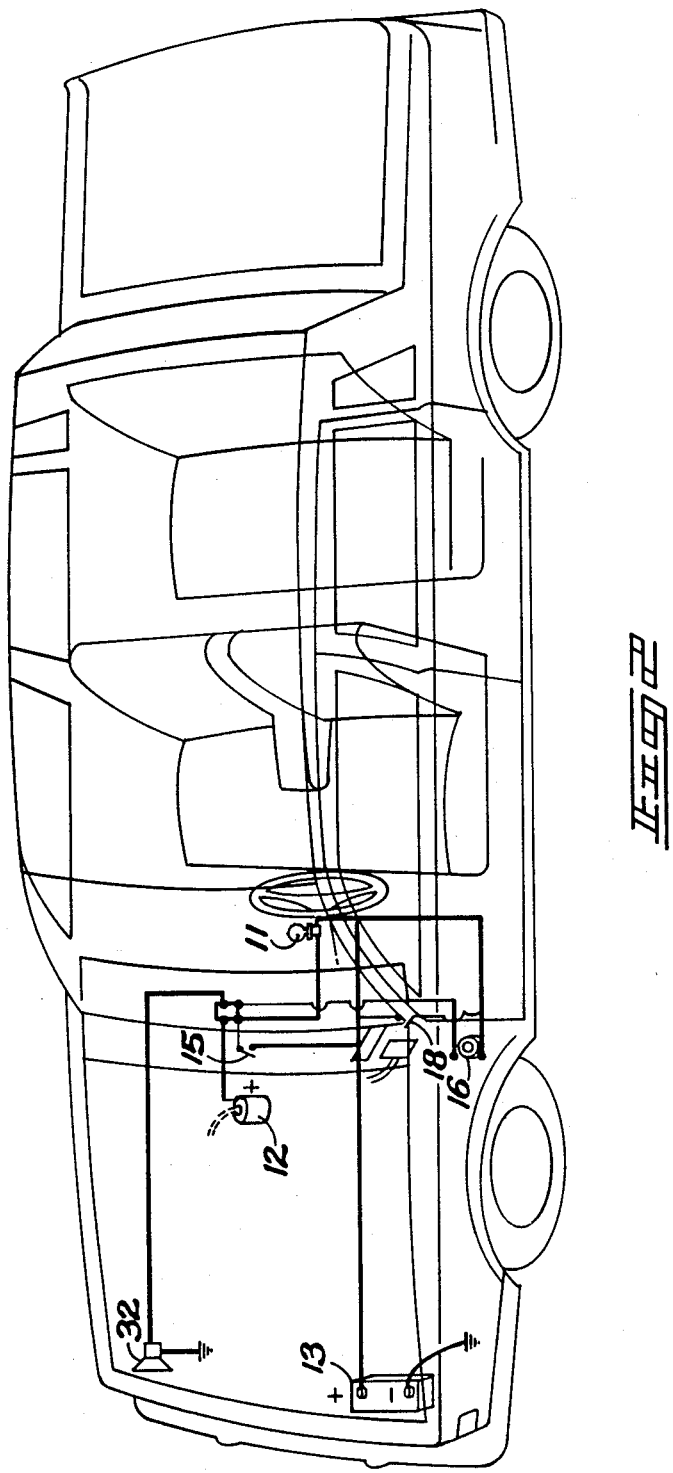

AUTOMOTIVE ALARM

BACKGROUND OF THE INVENTION

1. Field of the Invention

The field of invention relates to automotive alarm systems and more particularly relates to a new and improved automotive alarm wherein a predetermined time delay circuit provides an ignition cutoff and audible alarm sounding system preventing theft of an associated automobile.

2. Description of the Prior Art

The use of automotive alarm apparatus is well known in the prior art. As can be appreciated, these devices are of a relatively complex nature requiring significant expertise in their installation and utilization and as such has discouraged their implementation in the past. In this connection, there have been several attempts to develop automotive alarm systems which may be easily and efficiently utilized in theft prevention. For example, U.S. Pat. No. 4,222,033 to Brown provides an automobile anti-theft system including an ignition cutoff and circuitry in association with the automobile's horn system. A single switch relay is utilized including a timed circuit breaker actuating the automobile's horn and ignition system to render the automobile inoperative.

U.S. Pat. No. 3,614,458 to Stein sets forth a self-activating automobile prevention system wherein a time delay is utilized of a thermal type to interrupt the associated automobile's ignition circuit wherein a concealed relay defeating switch is provided to prevent actuation of the thermal operating time delay relay.

U.S. Pat. No. 4,291,296 to Seifers utilizes a circuit for disabling power to the automobile to render the same inoperative wherein an included alarm relay such as to the horn is utilized in the Seifers patent.

U.S. Pat. No. 4,320,382 to Roucek presents an automotive alarm system includes a plurality of self-latching relay devices wherein one or the other, but not both, must operate within a predetermined time after turning the ignition switch on. Failure to depress the horn ring within a predetermined time latches the horn ring or auxiliary alarm device and prevents starting the car. The Roucek patent is a functional solution to the rendering of an automobile inoperative but is relatively remote from the instant invention.

U.S. Pt. No. 4,107,962 to MacKlaon sets forth a circuit including a plurality of switches for rendering a fuel injection pump inoperative after an appropriate time delay. The patent is limited in scope of automobiles that may avail themselves of a theft prevention system as opposed to the instant invention.

As such, it may be appreciated that there is continuing need for a new and improved automotive alarm systems which addresses both the problem of effectiveness and ease of implementation, and in this respect, the present invention substantially fulfills this need.

SUMMARY OF THE INVENTION

In view of the foregoing disadvantages inherent in the known types of automotive alarm apparatus now present in the prior art, the present invention provides an automotive alarm apparatus wherein the same may be compactly positioned and effectively and readily secured to the existing automotive electrical system and can further be easily and efficiently utilized in the prevention of theft of an associated automobile. As such, the general purpose of the present invention, which will be described subsequently in greater detail, is to provide a new and improved automotive alarm apparatus which has all the advantages of the prior art automotive alarm devices and none of the disadvantages.

To attain this, the present invention comprises an automotive alarm apparatus which includes a pressure mounted switch for actuation of a time delay circuit to discontinue the flow of electricity to the automotive electrical system and concurrently effect actuation of an audible alarm. Optionally a further switch may be utilized wherein an unattended automobile may effect the time delay actuation of means to discontinue electrical flow to the automotive ignition system and furthermore actuate an alarm whereby a bypass switch may be utilized to disengage the alarm mechanism of the instant invention.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, not is it intended to be limiting as to the scope of the invention in any way.

It is therefore an object of the present invention to provide a new and improved automotive alarm apparatus which has all the advantages of the prior art automotive alarm apparatus and none of the disadvantages.

It is another object of the present invention to provide a new and improved automotive alarm apparatus which may be easily and efficiently manufactured and marketed.

It is a further object of the present invention to provide a new and improved automotive alarm apparatus which is of a durable and reliable construction.

An even further object of the present invention is to provide a new and improved automotive alarm apparatus which is susceptible of a low cost of manufacture with regard to both materials and labor, and which accordingly is then susceptible of low prices of sale to the consuming public, thereby making such automotive alarm apparatus economically available to the buying public.

Still yet another object of the present invention is to provide a new and improved automotive alarm apparatus which provides in the apparatuses and methods of the prior art some of the advantages thereof, while simultaneously overcoming some of the disadvantages normally associated therewith.

Still another object of the present invention is to provide a new and improved automotive alarm apparatus wherein circuitry is provided to effect energy discontinuance to the automotive ignition system and actuate an audible alarm simultaneously.

Yet another object of the present invention is to provide a new and improved automotive alarm apparatus wherein a cutoff switch is provided in a discrete position under the hood of an associated automobile to bypass the alarm system of the instant invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an isometric illustration illustrating the installation of an alarm system and module of the instant invention within an associated automobile.

DESCRIPTION OF THE PREFERRED EMBODIMENT

Figure 1:
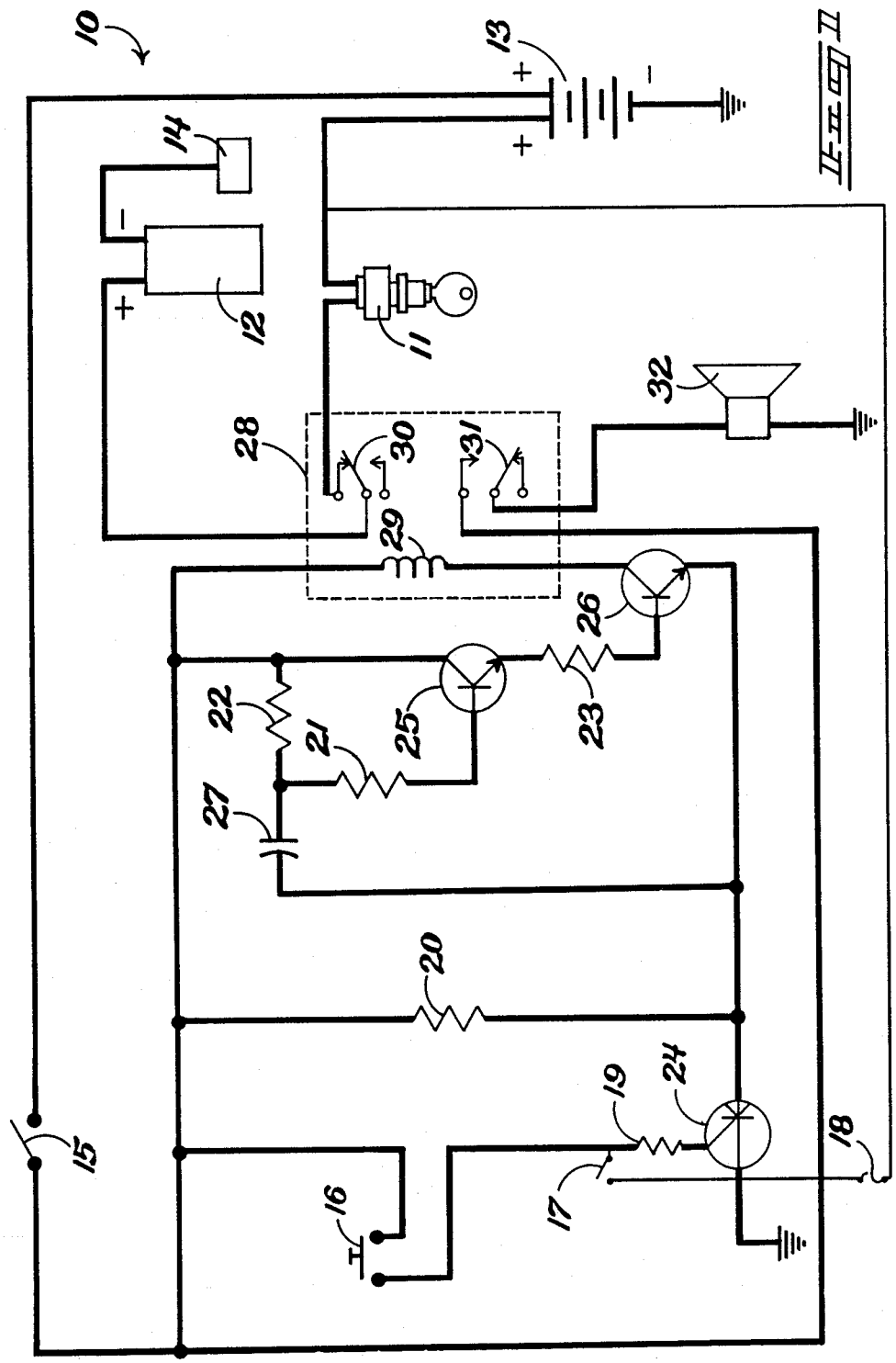
FIG. 1 is a diagrammatic representation of an automotive alarm device according to the instant invention.

With reference now to the drawings, and in particular to FIG. 1 thereof, a new and improved automotive alarm embodying the principles and concepts of the present invention and generally designated by the reference numeral 10 will be described.

More specifically, it will noted with reference to FIG. 1 that the automotive alarm 10 essentially comprises securement to an existing electrical system of an associated automobile including an ignition switch 11 and ignition coil 12 powered by conventional direct current battery 13 to ultimately energize the automotive ignition system 14 which includes conventional components such as a distributor, spark plugs, etc., of typical and well known organization in an automotive environment. A first disarm switch 15 is positioned in a discrete location under the hood of an associated automobile wherein a second switch comprising a pressure floor switch 16 is positioned at a convenient location proximate a driver's foot with a third hidden switch 17 for actuation of the alarm system in the absence of the automobile's owner whereupon the ignition switch 11 is actuated or bypassed by a would-be thief. The hidden switch 17 is electrically associated with the battery 13 by way of a fuse 18. (any fuse in the accessories fuse block)

Positioned between the SCR 24 and the hidden switch 17 and pressure floor switch 16 is a first resistor 19 to help avoid false triggering of the SCR 24 and is of a value of approximately 1M Ohms. In series therewith is a second resistor 20 of a value of approximately 5.1K Ohms with resistors 21 and 22 comprising third and fourth resistors respectively of 47K Ohms and 620K Ohms respectively in series with a fixed value capacitor 27. Between first triode transistor 25 and second triode transistor 26 is a fifth resistor 23 of a value of approximately 5.1K Ohms. It has been found that the optimum values of the respective first and second triode transistors 25 and 26 are of a 2N2222 or equivalent with the second triode transistor of a value of ECG 152 NPN or equivalent. SCR 24 is of a value ECG 5455 or equivalent.

The actuation of relay circuit 28 to effect disengagement of power to the automotive ignition system and simultaneously actuate horn 32 is formed of a relay coil 29 with a plurality of relay contacts comprising a first relay contact 30 and a second relay contact 31 operative with a 12 volt system.

The horn 32, as illustrated in FIG. 2, is positioned under the hood of an associated automobile to be actuated upon the unauthorized use of the aforenoted automobile.

As each SCR has a critical time factor and if the anode voltage supplied in a shorter period then this critical time, the SCR will turn on regardless of whether or not a signal is applied. Therefore the values R1 and R2 may be increased to help avoid this false triggering, relative to the aforenoted values. The use of the hidden switch 17 is optional but is highly desirable to enable an operator to be absence from an associated automobile and upon unauthorized use by a would-be thief or the like, the relay circuit 28 will actuate by the switching of contacts 30 and 31 to eliminate the power to the automobile's ignition system and actuate horn 32.

As to the manner of usage and operation of the present invention, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An automotive alarm apparatus in combination with an automobile to effect delayed deactivation of the automobile's ignition system and simultaneous activation of an audible alarm upon unauthorized use of the automobile comprising,
   an electrical circuit including:
   a plurality of switches comprising a first disarmed switch means for disarming the alarm apparatus secured under an engine hood of the automobile, and a second pressure actuatable switch means mounted on a floor of a passenger compartment of the automobile for foot actuation and activation of the audible alarm by an individual, and a relay circuit means electrically associated with the plurality of switches and an SCR element and a plurality of triode transistors for effecting a time delay to actuate the relay circuit means to deactivate the ignition system and actuate the audible alarm, and wherein said plurality of switches further includes a third hidden switch secured in the passenger compartment of the automobile for activation of the relay circuit means upon unauthorized use of the automobile, and wherein the plurality of switches are electrically associated in the electrical circuit including the SCR element and the relay circuit, wherein the SCR element is electrically associated in electrical series with a first resistor wherein said first resistor has a value of 1M Ohms, and wherein a second resistor is electrically associated in parallel to said first resistor and said SCR element is of a value of 5.1K Ohms, and wherein said relay circuit means includes a relay coil actuatable to actuate a plurality of contacts including a first contact to deactivate the ignition system and a second contact to actuate the audible alarm, and wherein said audible alarm comprises a horn positioned under the hood of the automobile, and wherein said first triode transistor comprises a 2N2222 transistor and said second triode transistor comprises an ECG 152 NPN transistor.

* * * * *